(12) United States Patent
Bélanger et al.

(10) Patent No.: US 10,644,319 B2
(45) Date of Patent: May 5, 2020

(54) PROCESS FOR PROTECTING ELECTRODE MATERIALS AGAINST MOISTURE

(71) Applicants: HYDRO-QUÉBEC, Montréal, Québec (CA); TRANSFERT PLUS, S.E.C., Montréal, Québec (CA)

(72) Inventors: Daniel Bélanger, Saint-Hubert (CA); Nicolas Delaporte, Montréal (CA); Karim Zaghib, Longueuil (CA)

(73) Assignees: TRANSFERT PLUS, S.E.C., Montreal, Quebec (CA); HYDRO-QUEBEC, Montreal, Quebec (CA)

( * ) Notice: Subject to any disclaimer, the term of this patent is extended or adjusted under 35 U.S.C. 154(b) by 135 days.

(21) Appl. No.: 15/576,126

(22) PCT Filed: Jan. 4, 2016

(86) PCT No.: PCT/CA2016/050002
§ 371 (c)(1),
(2) Date: Nov. 21, 2017

(87) PCT Pub. No.: WO2016/187699
PCT Pub. Date: Dec. 1, 2016

(65) Prior Publication Data
US 2018/0138512 A1    May 17, 2018

Related U.S. Application Data

(60) Provisional application No. 62/166,946, filed on May 27, 2015.

(51) Int. Cl.
| | |
|---|---|
| *H01M 4/485* | (2010.01) |
| *H01M 10/052* | (2010.01) |
| *C25D 11/00* | (2006.01) |
| *H01M 4/62* | (2006.01) |
| *H01M 4/36* | (2006.01) |
| *H01M 4/58* | (2010.01) |

(52) U.S. Cl.
CPC ............ *H01M 4/628* (2013.01); *C25D 11/00* (2013.01); *H01M 4/366* (2013.01); *H01M 4/485* (2013.01); *H01M 4/5825* (2013.01); *H01M 4/62* (2013.01); *H01M 4/622* (2013.01); *H01M 10/052* (2013.01); *H01M 2300/004* (2013.01); *H01M 2300/0082* (2013.01); *H01M 2300/0085* (2013.01)

(58) Field of Classification Search
CPC ........ H01M 4/628; H01M 4/622; H01M 4/62; H01M 4/5825; H01M 4/366; H01M 4/485; H01M 2300/0085; H01M 2300/0082; H01M 2300/004; H01M 10/052; C25D 11/00
See application file for complete search history.

(56) References Cited

U.S. PATENT DOCUMENTS

| | | | |
|---|---|---|---|
| 5,672,198 A | 9/1997 | Belmont | |
| 5,698,016 A | 12/1997 | Adams et al. | |
| 5,707,432 A | 1/1998 | Adams et al. | |
| 6,399,202 B1 | 6/2002 | Yu et al. | |
| 2013/0177805 A1 | 7/2013 | Crepel et al. | |
| 2013/0330615 A1 | 12/2013 | Morita et al. | |
| 2015/0119466 A1* | 4/2015 | Kundu | ............... A61K 49/0093 514/622 |
| 2016/0122187 A1* | 5/2016 | Lhost | ........................ C09C 1/44 524/104 |

FOREIGN PATENT DOCUMENTS

| | | |
|---|---|---|
| JP | H11213986 A | 8/1999 |
| WO | 01/28012 A1 | 4/2001 |
| WO | 01/28015 A1 | 4/2001 |
| WO | 2012/035217 A1 | 3/2012 |
| WO | 2012/111116 A1 | 8/2012 |

OTHER PUBLICATIONS

Extended European Search Report dated Dec. 20, 2018, issued by the European Patent Office in corresponding European Application No. 16798981.3-1108, (10 pages).
Shul, G. et al."Localized in situ Generation of Diazonium Cations by Electrocatalytic Formation of a Diazotization Reagent" ACS Appl. Mater. Interfaces, vol. 5, 2013, pp. 1468-1473.
Delaporte, N. et al."Chemically grafted carbon-coated LiFePO4 using diazonium chemistry" Elsevier, Journal of Power Sources, vol. 280, 2015, pp. 246-255.
Alloin, F. et al."The Interest of Diazonium Chemistry for Aqueous Lithium-Ion Battery" ECS, Journal of the Electrochemical Society, vol. 160, No. 5, 2013, pp. A3171-A3178.
Weissmann, M. et al."Modification of hydrophobic/hydropholic properties of Vulcan XC72 carbon powder by grafting of trifluoromethylphenyl and phenylsulfonic acid groups" Elsevier, Science Direct, Carbon, vol. 48, 2010, pp. 2755-2764.
Thomas, Y. R. J. et al."New Method for Super Hydrophobic Treatment of Gas Diffusion Layers for Proton Exchange Membrane Fuel Cells Using Electrochemical Reduction of Diazonium Salts" ACS Publications, American Chemical Society, vol. 7, 2015, pp. 15068-15077.

(Continued)

*Primary Examiner* — Muhammad S Siddiquee
(74) *Attorney, Agent, or Firm* — Buchanan Ingersoll & Rooney P.C.

(57) ABSTRACT

Described is a method or process for modifying the surface of carbon-coated electrochemically active materials such as complex oxides like olivine-type cathode materials. For instance, the surface of the carbon-coated powder material is modified to increase its hydrophobic characteristics. Also, specific groups may be grafted on the carbon surface of cathode material using the diazonium chemistry, for instance, by the spontaneous grafting of aryl ions generated in situ by the diazotization of an arylamine compound.

26 Claims, 8 Drawing Sheets

(56) References Cited

OTHER PUBLICATIONS

Delaporte, N. et al. "Increasing the Affinity Between Carbon-Coated LiFePO4/C Electrodes and Conventional Organic Electrolyte by Spontaneous Grafting of a Benzene-Trifluoromethylsulfonimide Moiety" ACS Publications, American Chemical Society, ACS Appl. Mater. Interfaces, vol. 7, 2015, pp. 18519-18529.
Madec, L. et al."Synergistic Effect in Carbon Coated LiFePO4 for High Yield Spontaneous Grafting of Diazonium Salt. Structural Examination at the Grain Agglomerate Scale" JACS, ACS Publications, J. Am. Chem. Soc, 135, 2013, pp. 11614-11622.
Martin, C. et al."Graphite-Grafted Silicon Nanocomposite as a Negative Electrode for Lithium-Ion Batteries" Adv. Mater., vol. 21, 2009, pp. 4735-4741.
Belanger, D. et al."Electrografting: a powerful method for surface modification" Chem. Soc. Rev., vol. 40, 2011, pp. 3995-4048.
Mandler, D. et al."Applications of Self-Assembled Monolayers in Elec tr oanal y tical Chemistry" Electroanalysis, vol. 8, No. 3, 1996, pp. 207-2013.
Adenier, A. et al."Study of the spontaneous formation of organic layers on carbon and metal surfaces from diazonium salts" Elsevier, ScienceDirect, Surface Science, vol. 600, 2006, pp. 4801-4812.
Mesnage, A. et al."Spontaneous Grafting of Diazonium Salts: Chemical Mechanism on Metallic Surfaces"Langmuir, American Chemical Society, vol. 28, 2012, pp. 11767-11778.
Martin, C. et al."Chemical Coupling of Carbon Nanotubes and Silicon Nanoparticles for Improved Negative Electrode Performance in Lithium-Ion Batteries" Adv. Funct. Mater. vol. 21,2011, pp. 3524-3530.
Shaidarova, L. G. et al."Chemically Modified Electrodes Based on Noble Metals, Polymer Films, or Their Composites in Organic Voltammetry" Pleiades Publishing, Ltd., Journal of Analytical Chemistry, vol. 63, No. 10, 2008, pp. 922-942.
Delamar M. et al."Covalent Modification of Carbon Surfaces by Grafting of Functionalized Aryl Radicals Produced from Electrochemical Reduction of Diazonium Salts" J. Am. Chem. Soc. vol. 114, 1992, pp. 5883-5884.
Barriere, F. et al"Covalent modification of graphitic carbon substrates by non-electrochemical methods" J Solid State Electrochem, vol. 12, 2008, pp. 231-1244.
Le Floch F. et al."Electrochemical signature of the grafting of diazonium salts: A probing parameter for monitoring the electro-addressed functionalization of devices" Elsevier, Electrochimica Acta, vol. 54, 2009, pp. 3078-3085.
Tanguy, F. et al."Lowering interfacial chemical reactivity of oxide materials for lithium batteries. A molecular grafting approach" The Royal Society of Chemistry, J. Mater. Chem., vol. 19, 2009, pp. 4771-4777.
Toupin, M. et al."Thermal Stability Study of Aryl Modified Carbon Black by in Situ Generated Diazonium Salt" J. Phys. Chem. C, vol. 111, 2007, pp. 5394-5401.
Toupin, M. et al."Spontaneous Functionalization of Carbon Black by Reaction with 4-Nitrophenyldiazonium Cations" Langmuir, American Chemical Society, vol. 24, 2008, pp. 1910-1917.
Abimar, P. et al."A mechanistic investigation into the covalent chemical derivatisation of graphite and glassy carbon surfaces using aryldiazonium salts" Research Article, Copyright, 2008 John Wiley & Sons, Ltd., J. Phys. Org. Chem., vol. 21, 2008, pp. 433-439.
Mahouche-Chergui, S. et al."Aryl diazonium salts: a new class of coupling agents for bonding polymers, biomacromolecules and nanoparticles to surfaces" Chem. Soc. Rev., vol. 40, 2011, pp. 4143-4166.
Yang, S. et al."Improving the cycleability of Si anodes by covalently grafting with 4-carboxyphenyl groups" Elsevier, Electrochemistry Communications , vol. 12, 2010, pp. 479-482.
Yang, S. et al."Covalent binding of Si nanoparticles to graphene sheets and its influence on lithium storage properties of Si negative electrode" The Royal Society of Chemistry, J. Mater. Chem., vol. 22, 2012, pp. 3420-3425.
International Search Report (PCT/ISA/210) dated Mar. 16, 2016, by the Japanese Patent Office as the International Searching Authority for International Application No. PCT/CA2016/050002.
Written Opinion (PCT/ISA/237) dated Mar. 16, 2016, by the Japanese Patent Office as the International Searching Authority for International Application No. PCT/CA2016/050002.
Chausse, A. et al."The Electrochemical Reduction of Diazonium Salts on Iron Elect.rodes. The Formation of Covalently Bonded Organic Layers and Their Effect on Corrosion" American Chemical Society, vol. 14, No. 1, 2010, pp. 392-400.
Weissmann, M. et al."Modification of Carbon Substrates by Aryl and Alkynyl Iodonium Salt Reduction" Langmuir, vol. 26, No. 18, pp. 15002-15009.
Office Action (Summary of Notice of Reasons for Rejection) dated Sep. 11, 2019, by the Japanese Patent Office in corresponding Japanese Patent Application No. 2017-561942, and an English Translation of the Office Action. (9 pages).

* cited by examiner

PROCESS FOR PROTECTING ELECTRODE MATERIALS AGAINST MOISTURE

PRIORITY APPLICATION

The present application claims priority, under the applicable law, to U.S. provisional application No. 62/166,946 filed on May 27, 2015, the content of which is incorporated herein by reference in its entirety and for all purposes.

TECHNICAL FIELD

The present application relates to processes for modifying the surface of carbon-coated electrode materials such as Li-ion cathode materials like complex oxides, for instance, complex oxides, especially for modifying carbon-coated olivine-type electrode materials. This application further contemplates the resulting modified materials and their use, for instance, in the preparation of electrodes and electrochemical cells.

TECHNICAL BACKGROUND

Olivine-type cathode material is a promising candidate for use in batteries, especially olivine-type lithium metal phosphate materials such as $LiFePO_4$. Its phosphate-containing structure provides it with good electrochemical stability and very good cyclability, however, its electronic conductivity is poor. To control its particle size, insure good surface crystallinity, and improve its conductivity, the material is generally coated with carbon. Another problem associated with $LiFePO_4$ relates to its storage which needs to be under controlled environment to avoid its oxidation. Olivine-type materials and especially $LiFePO_4$ are partially and rapidly oxidized when in contact with humidity. Consequently, ensuring the good stability of the powder when exposed to ambient air, for instance, under industrial conditions used for electrode fabrication, is a real challenge.

Reduction of diazonium salts has been investigated in the last decades for the functionalization of surfaces (see D. Belanger et al., *Chem. Soc. Rev.*, 2011, 40, 3995-4048; M. Delamar et al., *J. Am. Chem., Soc.* 1992, 114, 5883-5884; and M. Toupin et al., *J. Phys. Chem. C*, 2007, 111, 5394-5401), mainly including the modification of carbon material surfaces. Modified carbon surfaces may be prepared by reaction with a diazonium salt in a liquid medium to attach organic groups on the surface.

Modification is possible, for instance, by reaction of the substrate with diazonium ions generated in situ (see U.S. Pat. Nos. 5,672,198; 5,698,016; and 5,707,432). A substituted aromatic amine, in the presence of a diazotizing agent in solution, leads to the formation of the corresponding diazonium cation. The chemical grafting process leads to the attachment of different substituted aryl groups including a strong covalent carbon-carbon bond between the substrate and the grafted group. Grafting using the diazonium chemistry is generally accepted to occur via a radical mechanism (F. Barrière et al., *J. Solid State Electrochem.*, 2008, 12, 1231-1244). The resulting organic radical reacts with the surface and leads to a covalent bond (S. Mahouche-Chergui et al., *Chem. Soc. Rev.*, 2011, 40, 4143-4166). However, the functionalization mechanism for spontaneous grafting is still unclear (M. Toupin et al., *Langmuir*, 2008, 24, 1910-1917; F. Le Floch et al., *Electrochim. Acta*, 2009, 54, 3078-3085; A. Adenier et al., *Surface Science*, 2006, 600, 4801-4812; P. Abiman et al., *J. Phys. Org. Chem.*, 2008, 21, 433-439; and A. Mesnage et al., *Langmuir*, 2012, 28, 11767-11778. Nevertheless, previous studies have demonstrated that the layer could grow through radical reactions in the ortho position of the functional group (F. Barrière et al., Supra).

Diazonium-based functionalization has been first proposed for the stabilization of the carbon electrode of a Li-battery by formation of a lithium benzoate layer (see L. G. Shaidarova et al., *J. Anal. Chem.*, 2008, 63, 922-942) or nitrophenyl layer (see D. M. A. I. Turyan, *Electroanalysis*, 1996, 8, 207-213). Silicon anodes modified by organic molecules derived from diazonium ions have shown a superior cycling stability (see S. Yang et al., *J. Mater. Chem.*, 2012, 22, 3420; S. Yang et al., *Electrochem. Comm.*, 2010, 12, 479-482; C. Martin et al., *Adv. Funct. Mater.*, 2011, 21, 3524-3530; C. Martin et al., *Adv. Mater.*, 2009, 21, pp. 4735-4741). The initial study on diazonium modified positive electrode materials involved the grafting of nitrophenyl groups on $Li_{1.1}V_3O_8$ (F. Tanguy et al., *J. Mater. Chem.*, 2009, 19, 4771). Later, $LiFePO_4$ powders have been functionalized with redox molecules in order to assist the insertion of $Li^+$ ions (see L. Madec et al., *J. Pow. Sour.*, 2013, 232, 246-253). The spontaneous grafting of nitrophenyl groups at the surface of C—$LiFePO_4$ was attempted but partial oxidation of $LiFePO_4$ was observed, thus leading to the formation of a delithiated phase (see L. Madec et al., *J. Am. Chem. Soc.*, 2013, 135, 11614-11622).

Electrochemical grafting of 4-trifluoromethylbenzene groups was previously carried out on copper or glassy carbon electrodes (see M. Weissmann et al., *Carbon*, 2010, 48, 2755-2764; and G. Shul et al., *ACS Appl. Mater. Interfaces*, 2013, 5, 1468-1473). A Vulcan XC72 carbon powder typically used for the preparation of PEMFC Pt/C type active layer was also chemically modified by spontaneous grafting of 4-trifluoromethylbenzene groups. However, the grafting of 6.5 wt. % of these molecules significantly affected the macroscopic behavior of the carbon powder. U.S. Pat. No. 6,399,202 describes a process for the preparation of modified carbon black using 3-trifluoromethylaniline as the starting molecule.

SUMMARY

According to one aspect, this application relates to the preparation of electrode materials for incorporation in an electrochemical cell, the preparation comprising modifying the carbon surface of a carbon-coated electrochemically active material, by the grafting of hydrophobic groups. In one embodiment, the present technology relates to a process for preparing an electrode material, the process comprising a step of grafting, on an electrochemically active material, an aryl group of Formula (I):

(I)

wherein,
R is, independently in each occurrence, a hydrophobic group, for instance a substituted or unsubstituted $C_{1-12}$alkyl group, a substituted or unsubstituted $C_{5-12}$alkyl group, an unsubstituted $C_{5-12}$alkyl group, a $C_{1-3}$alkyl substituted with one or more hydrophobic group(s) such as fluorine, or R is a trifluoromethyl group or a fluorine, preferably a trifluoromethyl group; and n is an integer selected from 1 to 5, preferably n is within the range of from 1 to 3, preferably n is 1 or 2, or n is 1;

wherein the electrochemically active material comprises complex oxide particles coated with a carbon layer, and wherein said grafting occurs on the carbon layer. For instance, the aryl moiety of formula (I) is 4-trifluoromethylphenyl.

In one embodiment, the grafting process includes the steps of:
(a) generating a diazonium ion from an aniline of Formula (II):

(II)

wherein R and n are as defined above;
in the presence of a diazotizing agent, preferably a nitrite salt or an alkylnitrite; and
(b) reacting the diazonium ion generated in step (a) with the carbon layer of the electrochemically active material.

For example, the grafting step is achieved by electroreduction of the diazonium ion generated from the aniline of Formula (II). The diazotizing agent may also be generated through electrocatalytic reduction of nitrate.

In one embodiment, the diazonium ion is generated in situ. The diazonium ion may also be generated in a reaction medium prior to the addition of the electrochemically active material to the reaction medium. In the alternative, the diazonium ion may be generated prior to its addition to the reaction medium comprising the electrochemically active material.

According to one embodiment, the complex oxide comprised in the electrochemically active material is a material of Formula (III):

LiMPO$_4$ (III)

wherein M is at least one of Fe, Co, Ni, and Mn; or
wherein M is M'$_x$M"$_y$, where x+y=1, wherein M' and M" are each independently selected from Fe, Co, Ni, and Mn. For instance, the complex oxide is LiFePO$_4$, LiCoPO$_4$, LiMnPO$_4$, or LiFe$_x$Mn$_y$PO$_4$ wherein 0<x,y<1 and x+y=1, preferably the complex oxide is LiFePO$_4$. For example, the complex oxide Formula III is of olivine type.

According to another embodiment, the complex oxide is a titanate or lithium titanate such as Li$_4$Ti$_5$O$_{12}$. According to a further embodiment, the electrochemically active material used in the process comprises nanoparticles of the carbon-coated complex oxide.

According to another embodiment, the grafting step is carried out for a period of 16 hours or less, of 12 hours or less, or of 2 to 12 hours, of 8 hours or less, or of 2 to 8 hours, limits included. The grafting may be carried out at a temperature between 0° C. and room temperature, limits included. Preferably, the grafting step is carried out under inert atmosphere, such as under argon or nitrogen. The grafting step may be carried out in a polar solvent, examples of which include, without limitation, acetonitrile, water, a carbonate (e.g. propylene carbonate, ethylene carbonate, or a dialkyl carbonate), dimethyl sulfoxide, or any combination of the foregoing.

The process may also further comprise a step of drying the grafted material under reduced pressure at a temperature of about 50° C. to about 110° C. for a period of at least 12 h, preferably at about 70° C. The aniline concentration in the reaction medium may range from about 2 to about 200 mmol/L, or from about 20 to about 160 mmol/L. The diazotizing agent may be used in a range of 1 to 3 molar equivalents with respect to the aniline, for instance from 1 to 2 equivalents. The electrochemically active material may be used in the reaction medium at a concentration ranging from about 5 g/L and about 50 g/L, for instance at about 30 g/L.

According to a further embodiment, the process as herein defined may further comprise a step of relithiating the electrode material by contacting the grafted material with lithium ions, for instance, with a molar excess of lithium ions in solution.

According to another aspect, the present technology relates to an electrode material prepared by a process as defined herein with reference to any of the foregoing embodiments. The electrode material (the grafted electrode material) is an electrochemically active material comprising complex oxide particles coated with a carbon layer, wherein an aryl group of Formula (I) is linked, through a carbon-carbon covalent bond, to the carbon layer of the electrochemically active material. The electrode material may be characterized in that the grafting rate of the aryl group is of at least 0.1 wt. %, with respect to the total weight of the electrode. For instance, the grafting rate is from about 0.1 wt. % to about 1.5%, or from about 0.1 wt. % to about 0.8 wt. %, or from about 0.5 wt. % to about 1.2 wt. %, or from about 0.5 wt. % to about 0.8 wt. %.

According to a further aspect, the present technology relates to an electrode comprising on a current collector, a layer or film comprising an electrode material as defined in any of the foregoing embodiments, or as obtained by any one of the processes described in the present application. In one embodiment, the electrode is a cathode. For instance, the electrode may also further comprise one or more additives such as a binder, for instance, a polymer binder.

According to yet another aspect, the present technology relates to electrochemical cells comprising an electrode as described in the present application, an electrolyte and a counter-electrode (a second electrode of inverse polarity). For instance, the electrolyte may be a liquid or gel electrolyte, which may comprise a lithium salt in a solvent such as ethylene carbonate, propylene carbonate, a dialkyl carbonate, or a combination thereof (e.g. a 1 M solution of LiPF$_6$ in EC:DC:DCM). The gel electrolyte may further comprise a polymer. As another example, the electrolyte may be a solid polymer electrolyte, for instance, comprising an ion-conductive branched cross-linkable polymer.

According to a further aspect, the present technology relates to the use of a process as defined herein with reference to any one of the disclosed embodiments and examples, for the protection of an electrochemically active material against moisture.

BRIEF DESCRIPTION OF THE DRAWINGS

FIG. 1 shows photographs of (a) an unmodified C-LFP powder and (b) a modified C-LFP powder, both suspended in water.

DETAILED DESCRIPTION

The diazonium chemistry is herein described for the grafting of hydrophobic groups on the carbon surface of an electrochemically active material, for instance made of carbon-coated complex oxide particles. The present technology thus relates to a new route for increasing the hydrophobicity of carbon-coated complex oxide particles through their surface modification. For instance, the modification occurs by spontaneous reaction of in situ generated aryl ions with the carbon coating of the cathode material, the aryl ions resulting from the diazotization of anilines. For instance, the aniline may be an aniline group substituted with one or more hydrophobic substituent(s) such as alkyl, fluoroalkyl, or fluorine groups. The resulting electrode materials as well as their use in the preparation of electrodes for incorporation into electrochemical cells are also contemplated.

The electrochemically active material can be any carbon-coated material useful in electrodes, especially carbon-coated complex oxides in the form of particles, including nanoparticles. For instance, the present technology may be useful with complex oxides having reduced electron conductivity and which are often used in a carbon-coated particle form.

For instance, the complex oxide comprised in the electrochemically active material is a material of Formula (III):

LiMPO$_4$     (III)

wherein M is at least one of Fe, Co, Ni, and Mn; or wherein M is M'$_x$M''$_y$ where x+y=1, where M' and M'' are each independently selected from Fe, Co, Ni, or Mn.

For instance, the complex oxide is LiFePO$_4$, LiCoPO$_4$, LiMnPO$_4$, or LiFe$_x$Mn$_y$PO$_4$ wherein 0<x,y<1 and x+y=1, preferably the complex oxide is LiFePO$_4$. According to an embodiment, the complex oxide of Formula III is of the olivine type.

Other examples of complex oxides would be suitable in the present process. For instance, the complex oxide may be a titanate or lithium titanate such as Li$_4$Ti$_5$O$_{12}$.

The complex oxide particles are coated with a layer of a carbon material. Preferably, the carbon layer is uniform and adherent to the complex oxide particles, e.g. a non-powdery carbon coating. Such a carbon coating may be obtained, inter alia, from the decomposition, disproportionation, dehydrogenation or pyrolysis of a carbon precursor, such as an organic or polymeric carbon precursor.

The process of the present application includes a step of grafting, on the carbon coating of the electrochemically active material, an aryl moiety of Formula (I):

wherein,
R is, independently in each occurrence, a hydrophobic moiety, for instance a substituted or unsubstituted C$_{1-12}$alkyl group, a substituted or unsubstituted C$_{5-12}$alkyl group, an unsubstituted C$_{5-12}$alkyl group, a C$_{1-3}$alkyl substituted with one or more hydrophobic group such as fluorine, or R is a trifluoromethyl or fluorine group, preferably a trifluoromethyl group; and
n is an integer selected from 1 to 5, preferably n is within the range of from 1 to 3, preferably n is 1 or 2, or n is 1;
wherein the electrochemically active material comprises complex oxide particles coated with a carbon layer and wherein said grafting occurs on said carbon layer.

For instance, the term alkyl refers to a saturated branched or linear hydrocarbon residue which, unless specified otherwise, may also be substituted.

Examples of aryl groups of formula (I) include, without limitation, 4-pentylphenyl, 4-isoamylphenyl, 4-neopentylphenyl, 4-hexylphenyl, 4-heptylphenyl, 3,4-dimethylphenyl, 3,4-diethylphenyl, 3,4-dipropylphenyl, 3,4-dibutylphenyl, 2,4-dimethylphenyl, 2,4-diethylphenyl, 2,4-dipropylphenyl, 2,4-dibutylphenyl, 3,4,5-trimethylphenyl, 3,4,5-triethylphenyl, 4-fluorophenyl, 2,4-difluorophenyl, 3,4-ditrifluorophenyl, 4-trifluoromethylphenyl, 2,4-bis(trifluoromethyl)phenyl, 3,4-bis(trifluoromethyl)phenyl, 3,4,5-tris(trifluoromethyl)phenyl, and the like.

Generally, the grafting of an aryl group on the carbon layer of a particle can be illustrated as in Scheme 1:

Scheme 1 in situ

* carbon coated complex oxide particles

First, the aromatic amine reacts with the diazotizing agent (e.g. R'ONO as in Scheme 1) and forms a diazonium ion. This diazonium ion then further reacts with the carbon surface of a carbon-coated olivine-type cathode material particles to form a carbon-coated complex oxide particle which is aryl-grafted through a covalent carbon-carbon bond. The carbon-coated complex oxide particles may already be present in the reaction medium (i.e. the diazonium ion being formed in situ) and react with the diazonium ion as it forms.

As such, the grafting step of the process may comprise the steps of:
(a) generating a diazonium ion from a corresponding aniline of Formula (II):

(II)

wherein R and n are as defined above;
in the presence of a diazotizing agent; and
(b) reacting the diazonium ion generated in step (a) with the carbon layer of an electrochemically active material.

The grafting step may also be achieved by electroreduction of a diazonium ion generated from the aniline of Formula (II).

In any of the above grafting steps, the diazonium ion may be generated in situ. The diazonium ion may also be generated in a reaction medium prior to the addition of the electrochemically active material thereto. In the alternative, the diazonium ion may be generated prior to its addition to the reaction medium comprising the electrochemically active material. For instance, the freshly formed diazonium ion may be added at once or dropwise to the reaction medium containing the electrochemically active material.

The diazotizing agent may be a nitrite-containing agent or a nitrite ion generated in situ. For instance, the diazotizing agent (R'ONO) is a nitrite salt (e.g. R' is a cation like $Na^+$ and ONO is $NO_2^-$) or an alkylnitrite (e.g. where R' is an alkyl group) such as isoamylnitrite or tert-butylnitrite, preferably tert-butylnitrite. The diazotizing agent may also be the $NO_2^-$ ion generated in situ through the electrocatalytic reduction of a nitrate ion ($NO_3^-$). A reducing agent may also be added to promote the reduction of the diazonium ion formed (e.g. phosphorous acid).

The grafting step may be carried out for 16 hours or less, or between 2 to 12 hours, or between 2 to 8 hours, limits included. The grafting may also be carried out at a temperature between 0° C. and room temperature, limits included. Preferably, the grafting step is carried out under inert atmosphere, such as under argon or nitrogen. The grafting step may be carried out in a polar solvent, examples of which include, without limitation, acetonitrile, water, a carbonate (e.g. propylene carbonate, ethylene carbonate, or a dialkyl carbonate), dimethyl sulfoxide or a combination of any of the foregoing.

The process may also further comprise a step of drying of the grafted material under reduced pressure at a temperature of about 50° C. to about 110° C. for a period of time of at least 12 h, preferably at about 70° C. The concentration of the aniline in the reaction medium may range from about 2 mmol/L to about 200 mmol/L, or from about 20 to about 160 mmol/L. The diazotizing agent may be used within the range of 1 to 3 molar equivalents with respect to the aniline, for instance from 1 to 2 equivalents. The electrochemically active material may be used in the reaction medium at a concentration ranging from about 5 g/L to about 50 g/L, for instance at about 30 g/L.

The grafted material obtained by the above-described process may also be relithiated by contacting the grafted material with lithium ions, for instance, with a molar excess of lithium ions in solution. For instance, the grafted material is treated with a solution containing an excess of a lithium salt, such as a lithium iodide solution, preferably under inert atmosphere (e.g. under argon). For instance, the grafted material may be isolated and dried before relithiation or may be relithiated in situ after the grafting step.

The present technology also relates to an electrode material prepared by a process as defined herein. The electrode material generally is a grafted electrochemically active material which comprises carbon-coated complex oxide particles, the carbon coating of the grafted material being linked through a carbon-carbon covalent bond to an aryl group of Formula (I). The electrode material may be characterized in that at least 0.1 wt. % of the aryl group of Formula (I), with respect to the total weight of the electrode material, is grafted to the carbon layer of the electrochemically active material. For instance, about 0.1 wt % to about 1.5 wt. %, or about 0.1 wt. % to about 0.8 wt. %, or about 0.5 wt. % to about 1.2 wt. %, or about 0.3 wt. % to about 1 wt. %, or about 0.4 wt. % to about 0.9 wt. %, or about 0.5 wt. % to about 0.8 wt. % of aryl group is grafted. It should be noted that despite a low grafting rate (e.g. 0.5 to 0.8 wt. %), a macroscopic effect of the modification may be observed. As shown in Example 2, grafting of carbon-coated LFP particles protected the LFP against moisture. The new organic layer also has no undesired effects on the cycling of a battery.

For instance, the obtained grafted material comprises a complex oxide of the Formula $Li_zFePO_4$, where z is greater than or equal to 0.6, for instance z is within the range of about 0.6 to about 0.9. The electrode material obtained may be characterized in that, after stirring in water for about 50 hours at ambient temperature, $\Delta z$ is between about 0.05 and 0, preferably between about 0.02 and 0, $\Delta z$ being the variation of z between the initial value (of the grafted material) and the value of z after water treatment. Similarly, the electrode material obtained is characterized in that, after stirring in water for about 18 hours at 60° C., $\Delta z$ is between about 0.07 and 0, preferably between about 0.04 and 0, $\Delta z$ being as previously defined.

The electrode material obtained may be further characterized in that, after treatment in a 1 M solution of $LiPF_6$ in EC:DC:DCM (1:1:1) at a concentration of about 50 mg of powder per 10 mL of solution, under inert atmosphere for one month, the content in transition metal which is dissolved in the solution is less than 10 ppm, for instance about 6 ppm for iron when grafted C-LFP is used, which is less than a 5% loss.

The present technology also relates to an electrode comprising a layer or a film of an electrode material on a current collector, where the electrode material is as defined in any one of the herein defined embodiments, or is as obtained by one of the processes herein described. For instance, the electrode is a cathode. The layer of electrode material may be in the form of a composite and comprise further additives such as a binder, for instance, a polymer binder (e.g. PVDF, PTFE or CMC-Na) or a natural or synthetic rubber, lithium salts and/or additional conductive materials such as a carbon material (e.g. graphite, graphene, carbon fibers (e.g. VGCF), acetylene black, carbon black such as Ketjen™ black, etc.).

The above electrode may also be included in an electrochemical cell when combined with a counter-electrode, and an electrolyte. For instance, the electrolyte may be a liquid or gel electrolyte, which may comprise a lithium salt in a solvent such as ethylene carbonate, propylene carbonate, a dialkyl carbonate, or a combination of two of more of these (e.g. a mixture of EC:DC:DCM). Examples of lithium salts include, without limitation, $LiPF_6$, $LiBF_4$, $LiAsF_6$, $LiCF_3SO_3$, $Li(CF_3SO_2)_2N$ (LiTFSI), and $Li(C_2F_5SO_2)_2N$ (LiBETI). The gel electrolyte may further comprise a polymer which forms a gel, for instance, upon initiation by irradiation or cell cycling. As another example, the electrolyte may be a solid polymer electrolyte, for instance, comprising an ion-conductive branched cross-linked polymer such as a star-shaped polymer based on ethylene oxide and cross-linkable groups such as acrylates and methacrylates.

EXAMPLES

The following non-limiting examples are for the purpose of illustrating the present technology. Unless otherwise indicated, all numbers expressing quantities of reagents and starting materials, reaction conditions, concentrations, properties, and so forth, used in the description and claims are to be understood as being modified in all instances by the term "about." At the very least, each numerical parameter should at least be construed in light of the number of reported significant digits and by applying usual rounding techniques. The numerical values set forth in the specific examples are, however, reported as precisely as possible. Any numerical value will inherently contain certain errors resulting from variations in experimental conditions, measurements, and the equipment used.

The present technology also relates to novel materials and to their methods of preparation. Those skilled in the art will promptly recognize appropriate variations from the procedures as to starting materials, reaction conditions and techniques used. Starting materials and solvents used in the following examples are generally obtained from known commercial sources such as Sigma-Aldrich Co. Carbon-coated $LiFePO_4$ may be prepared according to known methods.

Example 1—Preparation of Electrode Materials

Examples 1.1 to 1.6 illustrate methods for the preparation of grafted hydrophobic carbon-coated $LiFePO_4$ powders.

1.1. Grafted C-LFP (40 mmol/l 4-$CF_3$aniline and 1 eq tert-butylnitrite)

Carbon-coated $LiFePO_4$ with a surface area of 15-18 $m^2$/g was used. Typically 1.5 g of C—$LiFePO_4$ was dispersed in 50 mL of acetonitrile (HPLC grade), followed by the addition of 0.254 mL of 4-trifluoromethylaniline. The mixture was stirred until complete dissolution of the amine and sonicated during 10 min. After addition of 0.264 mL of tert-butylnitrite, the in situ generated 4-trifluoromethylbenzene diazonium ion was formed, which reacted with the carbon surface of C—$LiFePO_4$. The resulting mixture was stirred overnight at room temperature. The mixture was then vacuum filtered using a Buchner assembly and a Nylon filter with a pore size of 0.47 μm. The modified powder was washed successively with an excess of acetonitrile, DMF, methanol and acetone. Finally, the modified powder was dried under vacuum at 70° C. for at least 12 hours.

1.2. Grafted C-LFP (160 mmol/l 4-$CF_3$aniline and 1 eq tert-butyl nitrite)

The carbon-coated $LiFePO_4$ of this example was prepared following the procedure described in Example 1.1; except, 1.02 mL of 4-trifluoromethylaniline, and 1.06 mL of tert-butylnitrite were used.

1.3. Grafted C-LFP (40 mmol/l 4-$CF_3$aniline and 2 eq tert-butylnitrite)

The carbon-coated $LiFePO_4$ of this example was prepared following the procedure described in Example 1.1; except, 0.529 mL of tert-butylnitrite was used.

1.4. Grafted C-LFP (160 mmol/l 4-$CF_3$aniline and 2 eq tert-butylnitrite)

The carbon-coated $LiFePO_4$ of this example was prepared following the procedure described in Example 1.1; except, 1.02 mL of 4-trifluoromethylaniline, and 2.12 mL of tert-butylnitrite were used.

1.5. Grafted C-LFP (40 mmol/l 4-$CF_3$aniline and 3 eq tert-butylnitrite)

The carbon-coated $LiFePO_4$ of this example was prepared following the procedure described in Example 1.1; except 0.793 mL of tert-butylnitrite was used. For this example, the carbon-coated $LiFePO_4$ contains, after grafting, 0.55 wt. % of grafted molecules. However, when evaluated by thermogravimetric analyses and ICP-AES measurements, the powder presented 20% of oxidation after the grafting reaction possibly due to the reduction process of the in situ generated 4-trifluoromethylbenzene diazonium ions at the carbon surface.

1.6. Grafted C-LFP (160 mmol/l 4-$CF_3$aniline and 3 eq tert-butylnitrite)

The carbon-coated $LiFePO_4$ of this example was prepared following the procedure described in Example 1.1; except, 1.02 mL of 4-trifluoromethylaniline, and 3.18 mL of tert-butylnitrite were used. For this example, the carbon-coated $LiFePO_4$ contains, after grafting, 0.78 wt. % of grafted molecules. However, evaluated by thermogravimetric analyses and ICP-AES measurements, the powder presented 30% of oxidation after the grafting reaction possibly due to the reduction process of the in situ generated 4-trifluoromethylbenzene diazonium ions at the carbon surface.

Example 2—Analysis of Properties 2.1 Grafted C-LFP Properties

Figure 1:
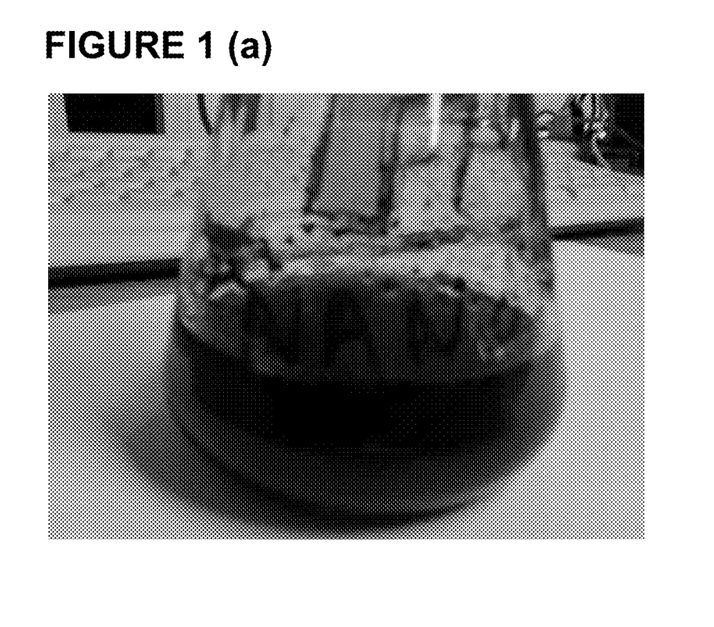

The reaction of a C-LFP suspension in acetonitrile with in situ generated diazonium ions as in the above examples leads to a grafting rate within the range of about 0.5 to about 0.8% according to thermal analyses. From a macroscopic point of view, the functionalization allows to obtain a hydrophobic powder (see FIG. 1). In fact, the unmodified C-LFP powder (FIG. 1(a)) shows a suspension in water while the modified C-LFP powder remains on the surface and does not mix even with magnetic stirring (FIG. 1(b)). The grafting reaction itself is accompanied by partial oxidation of the powder. Analysis of the lithium content by ICP-AES (see Table 1) shows that the modified sample contains about 28% of a delithiated phase.

TABLE 1

Lithium content of modified and unmodified powders by ICP-AES

| Sample | X in $Li_xFePO_4$ |
|---|---|
| Unmodified C-LFP | 1 |
| Modified C-LFP | 0.72 |

2.2 Grafted C-LFP Protection Against Water

Figure 2:
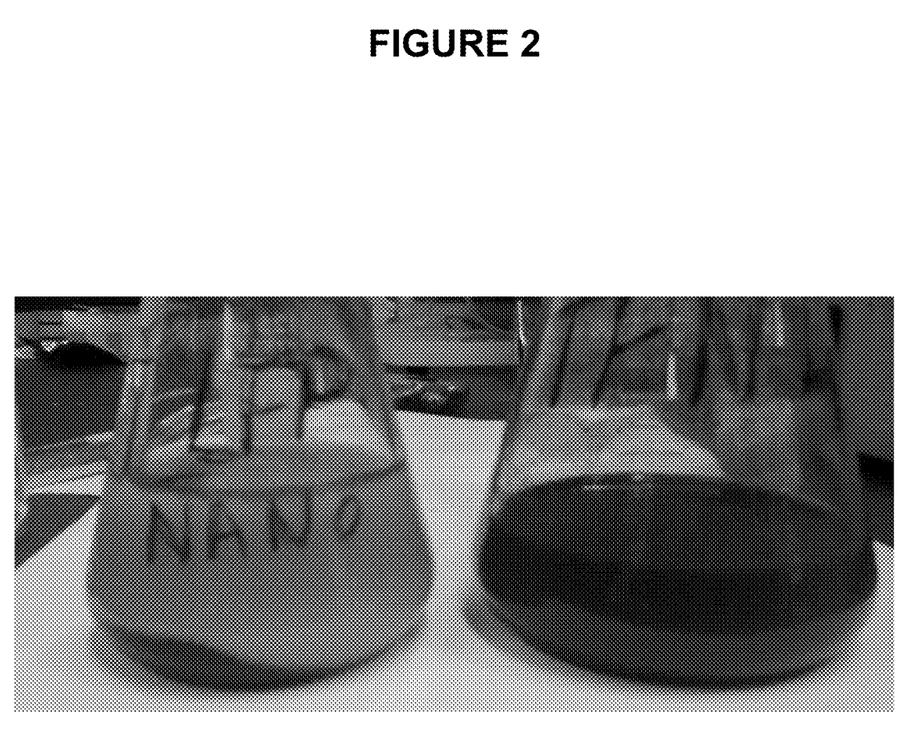
FIG. 2 shows a photograph of unmodified C-LFP powder (left) and modified C-LFP powder (right), after stirring in water for 24 hours.

After stirring for 24 h at room temperature, a portion of the carbon coating of unmodified C-LFP is deteriorated (FIG. 2, left flask). LFP without the carbon coating is thus found after filtration and a partial oxidation of the powder is observed. In the case of the modified C-LFP powder, protection against water is well confirmed (FIG. 2, right flask).

The lithium content analytical method of example 2.1 was also used to estimate the quantity of lithium removed from powders in contact with water under various conditions.

As shown in Table 2, after being in contact with water for 50 hours at room temperature, the unmodified C-LFP was partly oxidized. Other techniques (thermogravimetric analysis, infrared spectroscopy) also confirmed that the carbon coating was lost. After treatment at 60° C. for 18 hours, the unmodified powder had a similar level of oxidation and the degradation of the carbon coating had increased.

For the modified sample, after 50 hours at ambient temperature or after 18 h at 60° C. in water, only a small amount of lithium was disinserted from C-LFP compared to the initial content.

TABLE 2

Lithium content of modified and unmodified powders by ICP-AES

| Sample | z in $Li_zFePO_4$ | $|\Delta z|$ |
|---|---|---|
| Unmodified C-LFP | 1 | — |
| Unmodified C-LFP, 50 h, RT | 0.66 | 0.34 |
| Unmodified C-LFP, 18 h, 60° C. | 0.71 | 0.29 |
| Modified C-LFP | 0.72 | — |
| Modified C-LFP, 50 h, RT | 0.70 | 0.02 |
| Modified C-LFP, 18 h, 60° C. | 0.68 | 0.04 |

2.3 Iron Dissolution Rate in Electrolyte for Grafted C-LFP

The dissolution of the transition metal (iron for C-LFP) is one of the undesirable effects, which occurs during the cycling of batteries. The presence of traces of water either in the electrochemically active material or in the electrolyte, quickly leads to the formation of hydrofluoric acid (HF), causing a dissolution of the transition metal. To investigate iron dissolution in the electrolyte, 50 mg of either modified or unmodified powders are added to 10 mL of 1M solution of $LiPF_6$ in EC:DC:DMC (1:1:1) and kept under argon for 1 month. After filtration, the electrolyte was analyzed by atomic absorption in order to determine its iron concentration. Concentrations of iron in the electrolyte for the modified and unmodified C-LFP are presented in Table 3. A smaller iron concentration for the modified sample demonstrates that surface modification also prevents the dissolution of the transition metal.

TABLE 3

Dissolved Fe in 1M $LiPF_6$ EC:DC:DMC
(1:1:1) after a 1-month immersion

| Sample | Fe in electrolyte (ppm) |
|---|---|
| Unmodified C-LFP | 13 |
| Modified C-LFP | 6 |

The values correspond to 9.1% of iron from the unmodified C-LFP which is dissolved in the electrolyte solution compared to 4.6% for the modified C-LFP.

Example 3—Relithiation of Electrode Material

Relithiation of modified samples is possible. A 0.5M solution of lithium iodide (Li:Fe=6:1) in acetonitrile was used to relithiate the samples. The reaction was carried out for 24 h under argon.

Example 4—Preparation of Additional Electrode Materials

Four powders, named $TFN_1$ to $TFN_4$, were prepared according to the experimental conditions presented in Table 4 (C-LFP: unmodified $C-LiFePO_4$). In order to maximize the grafting of trifluoromethylphenyl groups at the surface of the cathode material, 3 equivalents of tert-butylnitrite were used even though it was shown that the latter partially oxidizes $C-LiFePO_4$.

Table 4 also presents the properties of the materials obtained, including their molecule grafting rates (in weight percentage) as well as their oxidation rate determined by thermogravimetric analysis (TGA) and by ICP.

TABLE 4

Modified LiFePO4, grafting rate (wt. %) and oxidation rate

| Sample | Amine (mmol) | t-Bu-nitrite (mmol) | Grafting rate (%) by TGA | z in $Li_zFePO_4$ by TGA | z in $Li_zFePO_4$ by ICP |
|---|---|---|---|---|---|
| C-LFP | — | — | — | 0 | ~0 |
| $TFN_1$ | 2 | 6 | 0.55 | 0.8 | 0.8 |
| $TFN_2$ | 4 | 12 | 0.6 | 0.73 | 0.75 |
| $TFN_3$ | 6 | 18 | 0.71 | 0.74 | 0.73 |
| $TFN_4$ | 8 | 24 | 0.78 | 0.68 | 0.72 |

The presence of grafted trifluoromethylphenyl groups in sample $TFN_4$ is also confirmed by a peak at 293 eV associated to the C—F bond by X-ray photoelectron spectroscopy (XPS). This peak is absent from the unmodified C-LFP material. The presence of a broad peak centered at 688 eV on the core spectrum F 1s of sample $TFN_4$ also demonstrates the presence of the grafted groups.

Example 5—Oxidation and Grafting Rates

Figure 3:
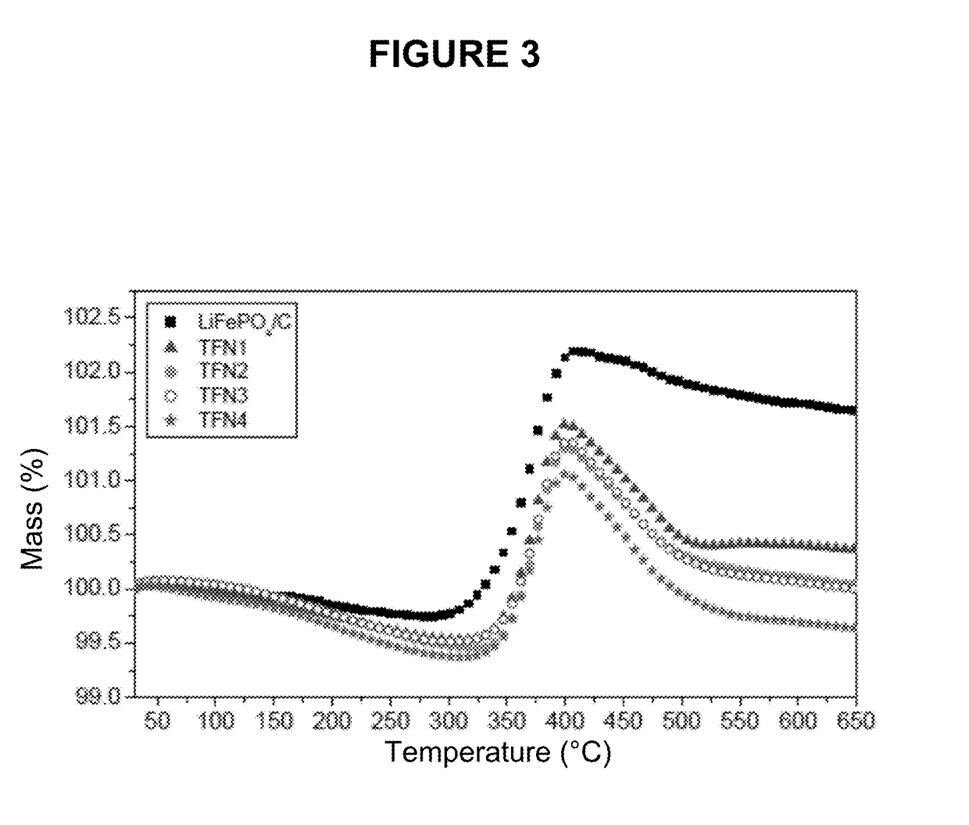
FIG. 3 presents thermogravimetric curves recorded in air for unmodified LiFePO$_4$/C and for the 4 powders of Example 4 modified with trifluoromethylphenyl groups.

FIG. 3 presents the thermogravimetric analysis curves of the unmodified $LiFePO_4$/C (C-LFP) and of the 4 modified powders of Example 4. The original material has a mass gain of approximately 2.5% between 300 and 400° C. followed by a mass loss of 0.6% between 400 and 600° C. The oxidation of the material causes the formation of $Li_3Fe_2(PO_4)_3$ and $Fe_2O_3$ leading to the recorded mass gain. The powder is in fact totally orange at the end of the experiment, a color typical of hematite ($Fe_2O_3$). The mass loss that follows is associated to the degradation of the carbon layer coating the LiFePO$_4$ particles.

The start of the mass gain appears at higher temperatures (about 50° C.) for the grafted samples compared to the unmodified powder. The increase in thermal stability of the grafted LiFePO$_4$/C would be associated to the modification of the surface itself. Another difference resides in the mass gain, much lower for the modified powders. Furthermore, when the concentration in precursors (e.g. amine and tert-butylnitrite) increases (see table 4), the mass gain becomes weaker. This observation suggests that the modified powder is further oxidized when the precursor concentration is increased. The oxidation rate can be estimated by considering that 2.5% of the mass gain for the unmodified LiFePO$_4$/C corresponds to 100% of the oxidation. The values found were gathered in table 4 (by TGA). These results are very similar to those obtained by chemical analysis of lithium after acid digestion of powders (by ICP) and reveal oxidation rates going from 20 to 32%.

Example 6—Stability in Water

In order to demonstrate the hydrophobic character of the functionalized powder, the unmodified and modified (TFN4) LiFePO$_4$/C were dispersed and stirred in distilled water at room temperature for 24 h. The original LiFePO$_4$/C disperses easily in water. On the contrary, after modification of the material, the powder remains on the surface of the water and mixes very difficulty, even under strong stirring. In fact, the TFN$_4$ powder dispersed in water stays at its surface even during stirring. After 24 hours of moderate stirring, the TFN$_4$ powder becomes suspended, while for the unmodified LiFePO$_4$/C (FIG. 2) the material is found at the bottom of the vessel and the solution is light brown with, at its surface, residues of the carbon coating.

The brown powder from the unmodified LiFePO$_4$/C was recovered by filtration and centrifugation to be analyzed. More of this powder was obtained when the experiment was carried out at 60° C. for 18 h with the unmodified LiFePO$_4$/C while no discernable change was observed with the modified powder. The diffractogram of the brown powder (not shown), presents peaks corresponding to LiFePO$_4$.

Thermogravimetric analysis coupled to mass spectrometry was used to characterise this brown powder. In the mass spectrum of the original LiFePO$_4$/C, decomposition of the carbon coating in air gives rise to a broad peak between 350 and 500° C. associated to the production of CO$_2$ (m/z=44). For the brown powder, there is no peak on the temperature range studied. This result shows that the reaction between water and the unmodified LiFePO$_4$/C deteriorated the carbon coating of the cathode material. This is consistent with the presence of a black carbon suspension at the surface of the water after the 24 hours of reaction. On the contrary, the grafting of hydrophobic groups made it possible to preserve the carbon layer (no brown powder recovered) and thus to protect the material from oxidation for a longer period.

Example 7—Analysis of Hydrophobicity

Figure 4:
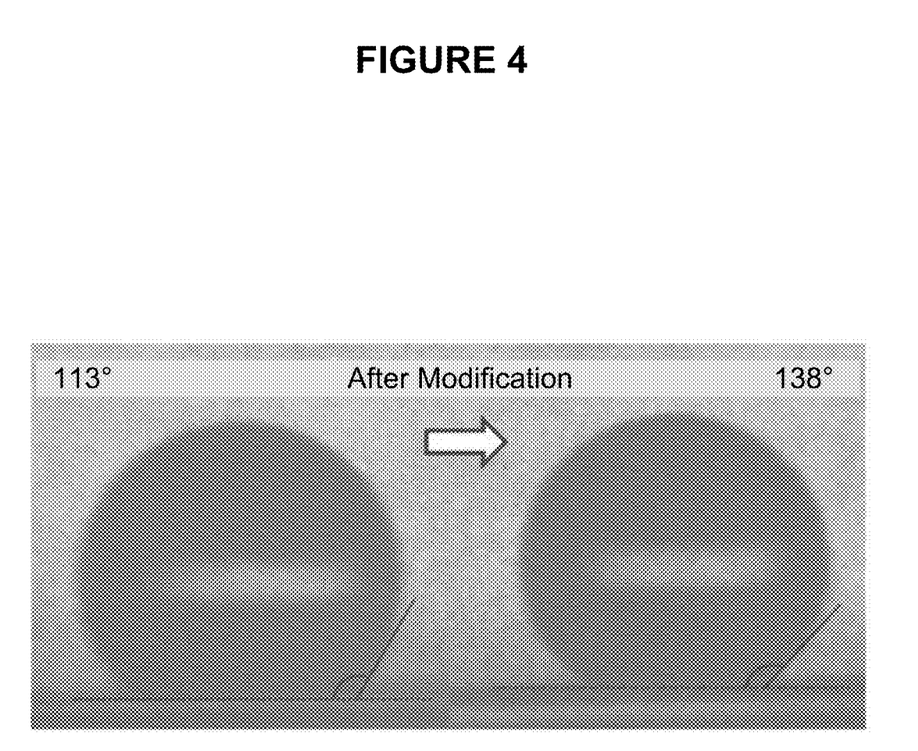
FIG. 4 illustrates the contact angle measurement of a drop of water on unmodified LiFePO$_4$/C (left, 113°) and modified LiFePO$_4$/C (right, 138°) electrodes.

In order to confirm the hydrophobicity of the powder and also of the composite which constitutes the electrode used during the galvanostatic cycles, the contact angle of a drop of water on the surface of the electrodes comprising the modified and unmodified material was evaluated. FIG. 4 shows a photograph of the unmodified (left) and modified (right) LiFePO$_4$/C electrode.

Due to the presence of PVDF as binder in the electrode composition (10% by mass), the contact angles, even for the unmodified LiFePO$_4$/C cathode are quite high. However, after the grafting reaction, the contact angle increases from 113 to 138°, demonstrating that the modified material cathode is much more hydrophobic than the one comprising unmodified LiFePO$_4$/C. These results clearly show that the method of manufacturing of the electrodes does not alter the modified material and makes it possible to retain the properties of the functionalized LiFePO$_4$/C.

Example 8—Relithiation of the Modified Powders

Figure 5:
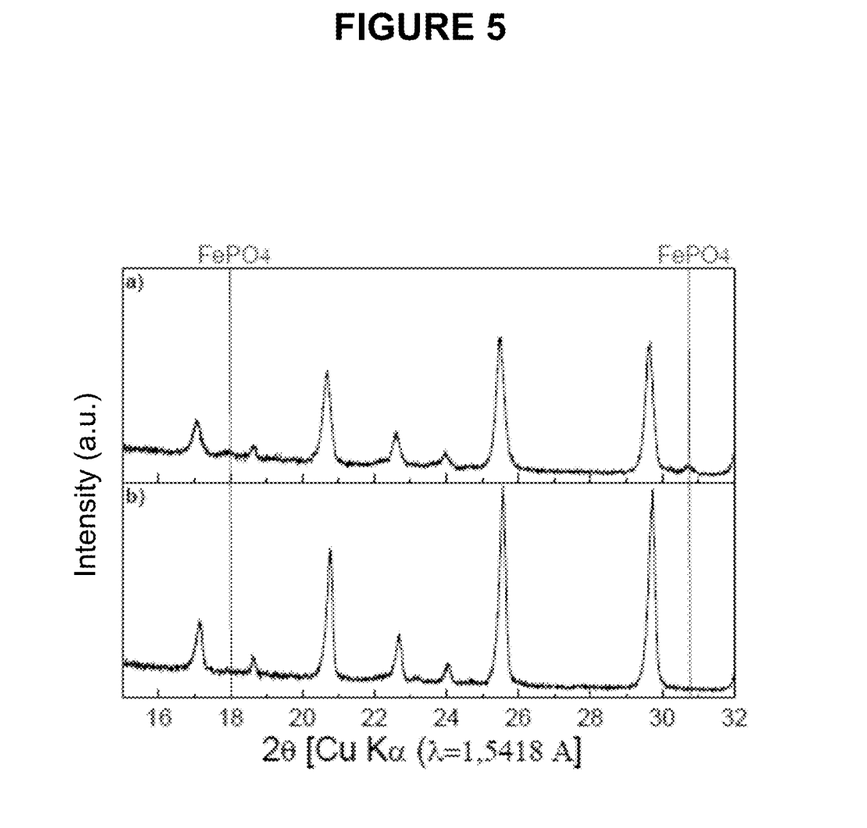
FIG. 5 shows the X-ray diffractogram of the TFN$_1$ grafted sample of Example 4 (a) before and (b) after chemical re-lithiation. The delithiated phase is no longer visible after relithiation.

The procedure of Example 3 was used for the relithiation of the modified TFN$_1$ LiFePO$_4$/C powder from Example 4. The diffractogram of the relitated TFN$_1$ powder is shown in FIG. 5(b). Compared to the TFN$_1$ powder before relithiation (FIG. 5(a)), it is clear that the delithiated phase has completely disappeared after chemical reduction. The low FePO$_4$ peaks are no longer present and those of LiFePO$_4$ are much more intense, a phenomenon opposite to that observed after the grafting of LiFePO$_4$/C.

Example 9—Electrochemical Properties

Electrodes of different thicknesses comprising the modified materials TFN$_1$ and TFN$_4$ were prepared and tested as cathodes in cells comprising a Li$_4$Ti$_5$O$_{12}$ anode. The anode material was supplied as an already prepared electrode. A nanoscale LiFePO$_4$ (unmodified) cathode sample made it possible to compare the performances in a complete system with those obtained with the electrodes of the present application. Important data for the two reference electrodes (anode and unmodified cathode) are reported in Table 5.

TABLE 5

Data of Li$_4$Ti$_5$O$_{12}$ and unmodified LiFePO$_4$ electrodes

| Electrode material | Molecular weight (g/mol) | Active material (mg)* | Active material (% mass) | Other components (% mass) | Electrode thickness (μm) |
|---|---|---|---|---|---|
| Li$_4$Ti$_5$O$_{12}$ | 459.1 | 8.433 | 82 | PVDF (NA) Ketjen black (NA) | 44 |
| LiFePO$_4$ | 157.7 | 9.190 | 89 | PVDF (5) VGCF (3) Carbon (3) | 40 |

*Data for an electrode cut in a circle, electrode surface ~1.767 cm$^2$.

It should be noted that the density of the unmodified LFP electrode (provided by Hydro-Quebec) is much greater because for an equal thickness of 40 μm, it contains twice as much active material. This difference is explained by the different electrode manufacturing method of the present application, for example, calendering of the LFP (HQ) cathode made it possible to obtain a denser electrode than the method used in the present application (without calendering). A spreading method such as that used for LFP would also make it possible to obtain denser electrodes with the present materials. The unmodified LFP electrode provided was still used in the electrochemical analysis as a comparison. Another reference electrode, including unmodified LFP but using the same technique as for the preparation of the modified material electrodes, was also prepared for comparison purposes.

Figure 6:
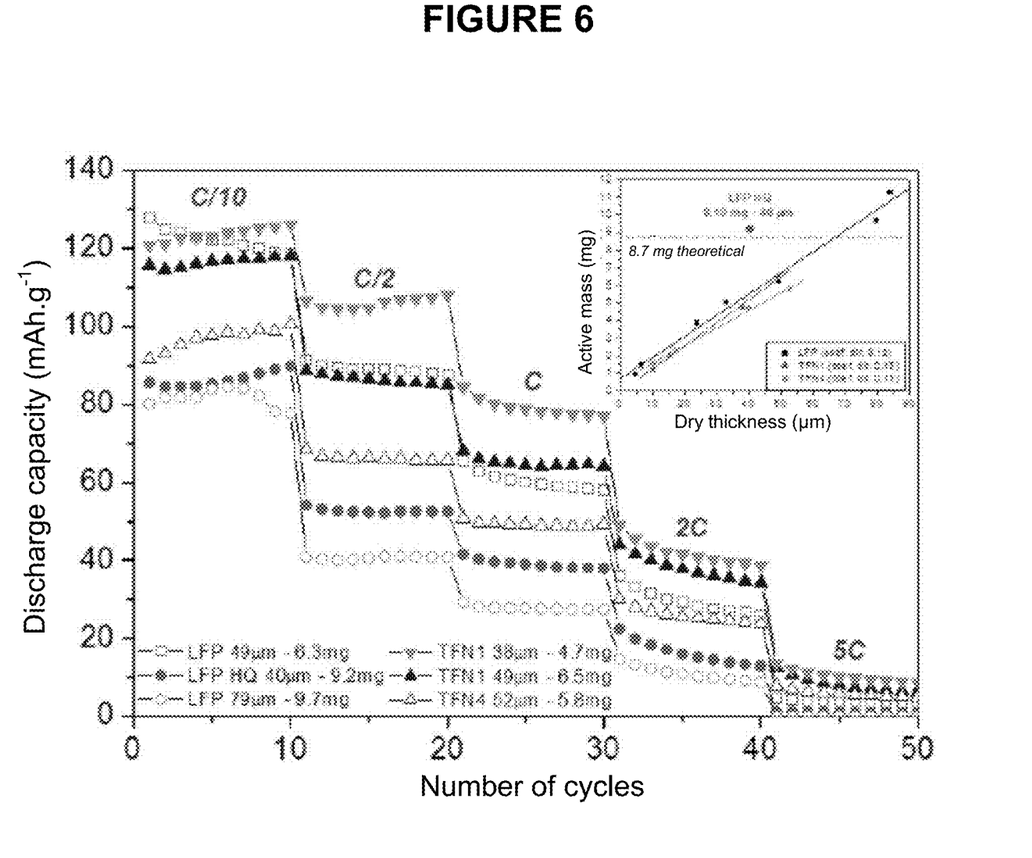
FIG. 6 shows the specific capacities obtained in discharge for various cathode thicknesses of LiFePO$_4$ (LFP), TFN$_1$, TFN$_4$ and for the LFP HQ cathode as a function of the cycling rate (mass and thickness in the bottom left). The figure insert allows cathode identification.

The electrochemical performances of all prepared modified and unmodified cathodes and of LFP (HQ) were compared, for similar electrode thicknesses and active masses, with similar thicknesses and different active masses, and finally with similar active masses and different thicknesses (see FIG. 6). In order to limit the effect of cathode thickness on electrochemical performances, the cathodes whose thickness is between 30 and 50 μm were compared. Three of them are relatively close in thickness (~50 μm) and in active mass (6-6.5 mg) and prepared from the 2 modified powders (TFN$_1$ and TFN$_4$) and from unmodified LiFePO$_4$. The effect of grafting can thus be determined. The LFP HQ (●) is compared to a LiFePO$_4$ (○) cathode, having about the same active mass but a different thickness, and to a TFN$_1$ (▼) cathode having the same thickness but a different active mass.

The three cathodes of similar active masses and thicknesses exhibit fairly similar specific capacity values for TFN$_1$ and LiFePO$_4$ with better capacity retention for TFN$_1$ as the cycling rate is increased. This behavior is attributed to the surface modification which appears to provide a more homogeneous electrode as shown in the Nyquist diagram of FIG. 7. Indeed, the charge transfer resistances (diameter of the semi-arc of a circle) for the TFN$_1$ cathodes are the lowest recorded. Thus, the TFN$_1$ cathode of 38 μm thickness is the one exhibiting the best electrochemical performances among all those presented, followed by the 49 μm TFN$_1$ electrode. For the TFN$_4$ cathode, the specific capacities obtained are slightly lower or similar to that of the LiFePO$_4$ cathode (49 μm-6.3 mg). This is associated with the charge transfer resistance higher than that of the LiFePO$_4$ cathode. On the other hand, the TFN$_4$ material is better protected against moisture than the material of the LiFePO$_4$ cathode (49 μm-6.3 mg).

Figure 7:
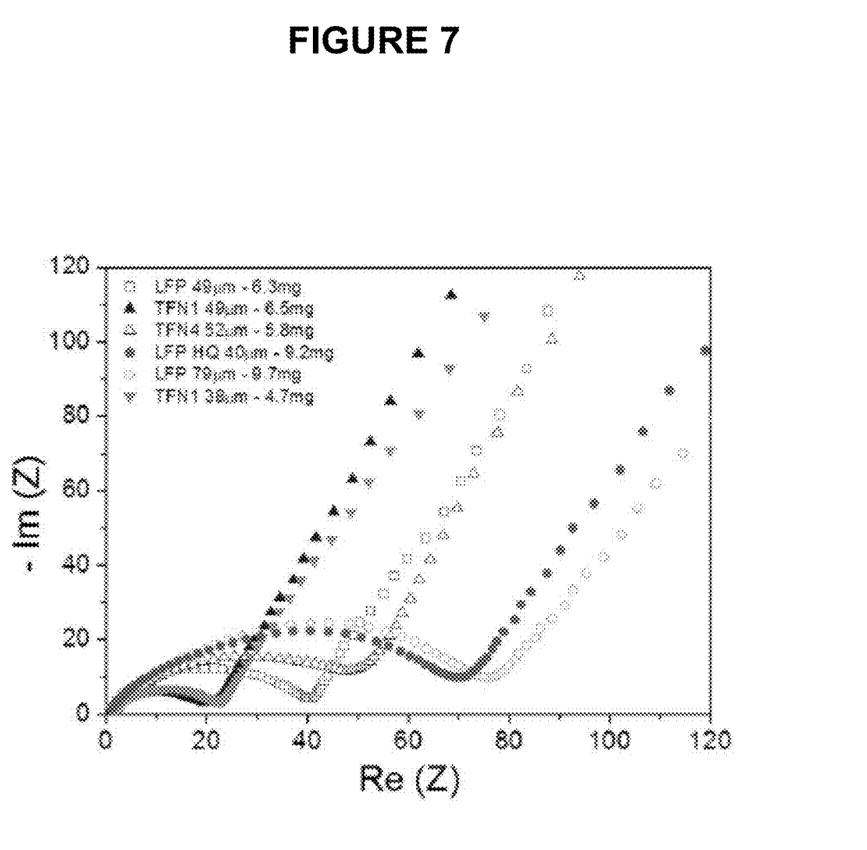
FIG. 7 shows a Nyquist diagram for various cathode thicknesses of LiFePO$_4$, TFN$_1$, TFN$_4$ and for the LFP HQ cathode (weight and thickness in the top left). Data recorded at 2.5 V vs. LTO.
Figure 8:
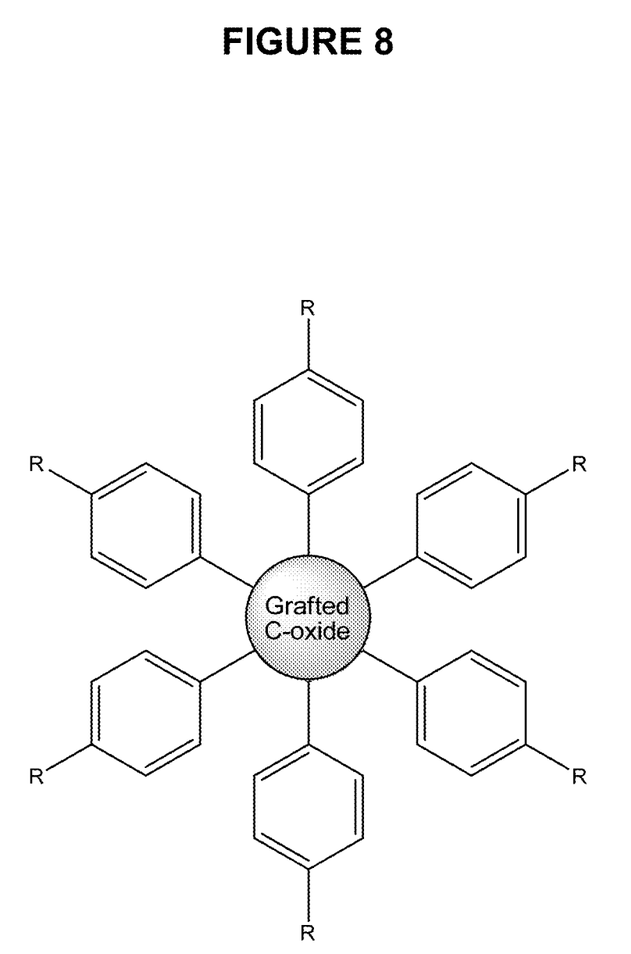
FIG. 8 illustrates a carbon-coated oxide particle (C-Oxide) on which are grafted aryl groups (R).

FIG. 7 shows that the greater the thickness of the electrode (○), the greater the charge transfer resistance (for the same material). As such, for electrodes which are too thick, the film becomes more and more resistant and low specific capacities are obtained, as shown in FIG. 7 for the 79 μm thickness LiFePO$_4$ cathode. However, for the LFP HQ (●) with a thickness half as small, a very similar semi-arc of circle is visible on the Nyquist diagram and the specific capacities in discharge are close to those obtained with the 79 μm thickness LiFePO$_4$ cathode (FIG. 6). Knowing that it is a calendered electrode, its thickness probably had to be much greater at the beginning. This would explain why such a semi-arc of circle is observed for this electrode, even though calendering initially serves to promote cohesion between the material and adhesion to the current collector to obtain denser electrodes.

Numerous modifications could be made to any one of the embodiments described above without departing from the scope of the present invention. The references, patents or scientific literature documents referred to in this application are incorporated herein by reference in their entirety and for all purposes.

The invention claimed is:

1. Process for preparing an electrode material, the process comprising a step of grafting, on an electrochemically active material, an aryl group of Formula (I):

(I)

wherein,
R is, independently in each occurrence, a hydrophobic group selected from a fluorine atom and a substitute or unsubstituted C$_{1-12}$ alkyl group; and
n is an integer selected from 1 to 5;
wherein the electrochemically active material comprises complex oxide particles coated with a carbon layer and wherein said grafting occurs on said carbon layer, the carbon layer forming a uniform and adherent coating on the complex oxide particles;
wherein the grafting comprises the steps of:
(a) generating a diazonium ion from an aniline of Formula (II):

(II)

wherein R is, independently in each occurrence, a hydrophobic group selected from a fluorine atom and a substitute or unsubstituted C$_{1-12}$ alkyl group, and n is an integer selected from 1 to 5,
in the presence of a diazotizing agent; and
(b) reacting the diazonium ion generated in step (a) with the carbon layer of the electrochemically active material.

2. Process according to claim 1, wherein: (i) the diazonium ion is generated in situ; (ii) the diazonium ion is generated in a reaction medium prior to adding the electrochemically active material to the reaction medium; or (iii) the diazonium ion is generated prior to being added to a reaction medium comprising the electrochemically active material.

3. Process according to claim 1, the process further comprising a step of reducing the diazonium ion generated by the addition of a reducing agent.

4. Process according to claim 1, wherein R is an unsubstituted C$_{5-12}$alkyl group or a C$_{1-3}$alkyl group substituted with one or more hydrophobic group.

5. Process according to claim 4, wherein the hydrophobic group is a fluorine.

6. Process according to claim 1, wherein n is 1, 2 or 3.

7. Process according to claim 1, wherein the aryl group of Formula (I) is 4-trifluoromethylphenyl.

8. Process according to claim 1, wherein the complex oxide is an olivine-type material of Formula (III):

LiMPO$_4$ (III)

wherein M is at least one of Fe, Co, Ni, and Mn; or
wherein M is M'$_x$M''$_y$, where x+y=1, wherein M' and M'' are each independently selected from Fe, Co, Ni, and Mn.

9. Process according to claim 8, wherein the complex oxide is LiFePO$_4$, LiCoPO$_4$, LiMnPO$_4$, or LiFe$_x$Mn$_y$PO$_4$ where 0<x, y<1 and x+y=1.

10. Process according to claim 1, wherein the complex oxide is a titanate or lithium titanate, or the complex oxide is Li$_4$Ti$_5$O$_{12}$.

11. Process according to claim 1, the process comprising at least one of the following conditions:
the grafting is carried out for a period of 16 hours or less, or of 2 to 12 hours, or of 2 to 8 hours, limits included;
the grafting is carried out at a temperature between 0° C. and room temperature, limits included;

the grafting is carried out under inert atmosphere; and/or
the grafting is carried out in a polar solvent.

12. Process according to claim 1, further comprising a step of drying the grafted material under reduced pressure at a temperature of about 50° C. to about 110° C. for a time of at least 12 h.

13. Process according to claim 1, wherein:
the aniline is used at a concentration ranging from about 2 mmol/L to about 200 mmol/L, or from about 20 to about 160 mmol/L;
the amount of diazotizing agent used is within the range of from 1 to 3 molar equivalents with respect to the aniline, for example from 1 to 2 equivalents; and/or
the electrochemically active material is used in a reaction medium at a concentration within the range of about 5 g/L to about 50 g/L.

14. Process according to claim 1, further comprising a step of relithiating the electrode material by contacting the grafted material with lithium ions.

15. An electrode material prepared by a process as defined in claim 1, wherein the electrode material comprises at least 0.1 wt. % of grafted aryl group, with respect to the total weight of the electrode material, or wherein the electrode material comprises from 0.5 wt. % to 0.8 wt. % of grafted aryl group, with respect to the total weight of the electrode material.

16. An electrode comprising a layer or a film comprising the electrode material as defined in claim 15 on a current collector.

17. Electrode according to claim 16 the layer or film further comprising a polymer binder.

18. An electrochemical cell comprising an electrode as defined in claim 16, an electrolyte and a counter-electrode.

19. Electrochemical cell according to claim 18, wherein the electrolyte is a liquid or gel electrolyte comprising a lithium salt in a solvent.

20. Electrochemical cell according to claim 18, wherein the electrolyte is a solid polymer electrolyte.

21. Use of a process as defined in claim 1, for the protection of an electrochemically active material against moisture.

22. Process according to claim 1, wherein the diazotizing agent is a nitrite salt or an alkylnitrite.

23. Process according to claim 11, wherein the inert atmosphere is argon or nitrogen.

24. Process according to claim 11, wherein the polar solvent comprises acetonitrile, water, a carbonate, dimethyl sulfoxide, or a combination of two or more thereof.

25. Process according to claim 24, wherein the carbonate is selected from propylene carbonate, ethylene carbonate or a dialkyl carbonate.

26. Process according to claim 12, wherein the temperature is of about 70° C.

* * * * *